(12) United States Patent
Jamp et al.

(10) Patent No.: US 6,816,459 B2
(45) Date of Patent: *Nov. 9, 2004

(54) METHOD AND APPARATUS FOR CONTROLLING NETWORK BANDWIDTH

(75) Inventors: Rueiming Jamp, Los Altos, CA (US);
Dzung-Ji Lii, Santa Clara, CA (US);
Wen-Tsing Chen, Cupertino, CA (US);
Jack Hsu, San Jose, CA (US)

(73) Assignee: Hi/fn, Inc., Los Gatos, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 09/956,487

(22) Filed: Sep. 19, 2001

(65) Prior Publication Data

US 2002/0085496 A1 Jul. 4, 2002

Related U.S. Application Data

(63) Continuation of application No. 08/914,043, filed on Aug. 5, 1997, now Pat. No. 6,320,846.

(51) Int. Cl.⁷ .............................. H04J 3/16; H04J 3/24
(52) U.S. Cl. ..................... 370/235; 370/392; 370/471
(58) Field of Search .............................. 370/230, 231, 370/235, 236, 389, 392, 400, 409, 465, 468, 470, 471, 474, 477; 709/232, 233, 234, 235

(56) References Cited

U.S. PATENT DOCUMENTS

| | | | | |
|---|---|---|---|---|
| 4,736,369 A | * | 4/1988 | Barzilai et al. | 370/231 |
| 4,769,815 A | * | 9/1988 | Hinch et al. | 370/236 |
| 5,014,265 A | * | 5/1991 | Hahne et al. | 370/236 |
| 5,063,562 A | * | 11/1991 | Barzilai et al. | 370/231 |
| 5,163,046 A | * | 11/1992 | Hahne et al. | 370/237 |
| 5,197,127 A | * | 3/1993 | Waclawsky et al. | 709/224 |
| 5,638,360 A | * | 6/1997 | Sugawara | 370/253 |

* cited by examiner

Primary Examiner—Alpus H. Hsu
(74) Attorney, Agent, or Firm—Dov Rosenfeld Inventek

(57) ABSTRACT

A method and apparatus controls network bandwidth between a first node and a second node on a network. A data element transmitted from the first node to the second node is intercepted. The data element comprises a data portion and a header portion including an original window size. The original window size in the header portion of the data element is replaced with a replacement window size, the data portion of the data element remaining unmodified. The data element is then routed to the second node, the header portion of the data element being coupled to the replacement window size.

4 Claims, 13 Drawing Sheets

| | NODE A | | NODE B |
|---|---|---|---|
| 1 | A | SEQ. 123001 - 124000, WINDOW 200, ACK. 9001 → | B |
| 2 | A | ← SEQ. 9001 - 9200, WINDOW 1000, ACK. 124001 | B |
| 3 | A | SEQ. 124001 - 125000, WINDOW 200, ACK. 9201 → | B |
| 4 | A | ← SEQ. 9201 - 9300, WINDOW 1000, ACK. 124001 | B |
| 5 | A | SEQ. 9301 - 9400, WINDOW 1000, ACK. 124001 → | B |
| 6 | A | SEQ. 125001 - 126000, WINDOW 200, ACK. 9401 → | B |
| 7 | A | ← SEQ. 9401 - 9600, WINDOW 10, ACK. 126001 | B |
| 8 | A | SEQ. 126001 - 126010, WINDOW 50, ACK. 9601 → | B |
| 9 | A | ← SEQ. 9601 - 9650, WINDOW 20, ACK. 126001 | B |
| 10 | A | SEQ. 126001 - 126020 WINDOW 50, ACK. 9651 → | B |

*FIG. 5B*
(PRIOR ART)

| VC IDENTIFIER | | THRESHOLD | | | CURRENT BANDWIDTH | GROUP | |
|---|---|---|---|---|---|---|---|
| VC1 | VIRTUAL CIRCUIT | T1 | T2 | T3 | — | G1 | ... |
| VC2 | AGGREGATE OF VIRTUAL CIRCUIT | | | | | G2 | ... |
| VC3 | VIRTUAL CIRCUIT | | | | | G3 | ... |
| VC4 | VIRTUAL CIRCUIT | | ... | | | | ... |
| | | | | | | | ... |
| | | | | | | | ... |
| VCN | AGGREGATE OF VIRTUAL CIRCUIT | | | | | G3 | ... |

TABLE 600

*FIG. 6A*

| | THRESHOLD | | | CURRENT BANDWIDTH | ... |
|---|---|---|---|---|---|
| | T1 | T2 | T3 | | |
| $G_1$ | | | | | ... |
| $G_2$ | | | | | ... |
| $G_3$ | | | | ... | ... |
| $G_N$ | | | | | ... |

TABLE 650

*FIG. 6B*

METHOD AND APPARATUS FOR CONTROLLING NETWORK BANDWIDTH

This application is a continuation of application Ser. No. 08/914,043, filed Aug. 5, 1997, now U.S. Pat. No. 6,320,846.

FIELD OF THE INVENTION

The present invention relates to the field of network technology. Specifically, the present invention relates to a method and apparatus for controlling network bandwidth.

DESCRIPTION OF RELATED ART

Figure 1:
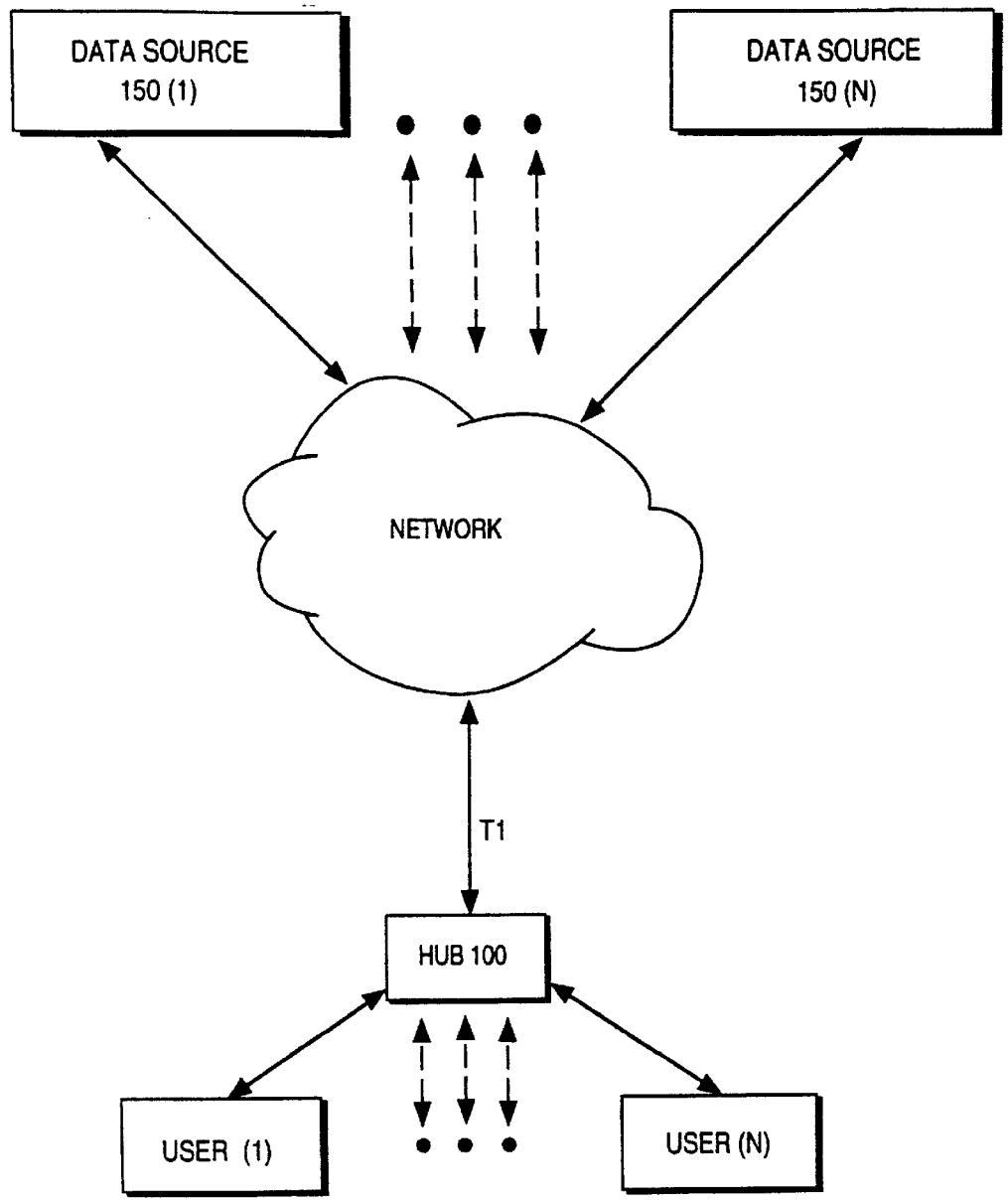

With the growth of the Internet, greater demands are being placed on networks, thus causing delays and bottlenecks that may have a severe impact on a user's quality of service. FIG. 1 illustrates an example of network congestion that may occur on a network today. The network includes multiple nodes, i.e. logical entities that are capable of receiving and transmitting data elements. In this example, data sources and users are nodes on the network. As illustrate, hub 100 is coupled to a network via a T1 line. A variety of data sources are also shown coupled to the network. The network may be any type of network including a Local Area Network (LAN), a Wide Area Network (WAN) or the Internet. Hub 100 may include any device on the network capable of coupling to data sources. An example of hub 100 may be a repeater or a switch in a corporation that connects all traffic between the users in the corporation and the Internet.

As illustrated, the hub is coupled to numerous users (User1 through UserN) accessing data sources 150(1)–150(N) via the T1 connection. Communication that occurs only amongst Users1-N is not affected by the T1 connection because the communication may occur without any of the users having to access any of the data sources via the T1 connection. An example of this type of communication is intranet communications that occur within a corporation, for example. The connection bandwidth of an intranet is generally on the order of 10–100 Mb/sec. This extremely high bandwidth is generally sufficient to handle a large amount of traffic amongst Users1-N without causing network congestion.

The problem of network congestion frequently arises when Users1-N attempt to perform activities that require a connection and interaction with data sources 150(1)–150(N). A T1 connection, in contrast with the intranet example described above, generally provides a bandwidth of approximately 1.5 Mb/sec. This bandwidth is clearly at least an order of magnitude less than the bandwidth available to intranet users. Thus, if User1, for example, attempts to perform transactions with data source 150(1) while UserN simultaneously attempts to perform transactions with data source 150(N), both users share this T1 connection to the network. All other users attempting to connect to data sources 150(1)–150(N) also share this limited T1 connection bandwidth. There is currently no restriction on the amount of bandwidth available to each user, and as such, one user may effectively monopolize the entire bandwidth of the T1 connection.

Thus, depending on the network activity patterns of each of these users, at any given time, the T1 connection between data source 100 and destination 150 may either be overloaded or underutilized. The T1 connection in this illustration is therefore a "bottleneck" that may cause severe traffic congestion if all users attempt to perform activities across the network via the T1 line. The problems caused by this scenario vary in degree based on the type of network and the type of protocol being utilized.

In a Transaction Control Protocol (TCP) network, for example, conventional TCP uses an indirect feedback mechanism to infer network congestion. TCP increases a connections' transmissions rate until it senses a problem such as packet loss, and then it retransmits the prior transmission after backing off for a period of time, resulting in a reduced transmission rate for the connection. TCP uses a sliding window flow control mechanism to increase and decrease the throughput over a network. The sliding window flow control mechanism functions as follows: a sender sends out multiple packets or elements of data, and then waits for an acknowledgment before sending out more data. The receiver acknowledges that it received the data from the sender. The receiver also advertises to the sender how much additional data it can receive. The latter information is known as the receiver's "window size." The window size thus may change from one transmission of data elements to another.

The mechanism described above for TCP clearly handles network congestion problems in only a limited manner, namely by continuously changing the data flow between a sender and a receiver. This mechanism does not, however, handle the allocation of bandwidth amongst various nodes on a network. Thus, in the example of FIG. 1 described above, there is no well-defined means today for controlling the bandwidth available to each of the users coupled to hub 100.

SUMMARY OF THE INVENTION

The present invention discloses a method and apparatus for controlling network bandwidth between a first node and a second node on a network. A data element from the first node to the second node is intercepted. The data element comprises a data portion and a header portion including an original window size. The original window size in the header portion of the data element is replaced with a replacement window size, the data portion of the data element remaining unmodified. The data element is then routed to the second node, the header portion of the data element being coupled to the replacement window size.

Other objects, features and advantages of the present invention will be apparent from the accompanying drawings and from the detailed description.

DETAILED DESCRIPTION OF THE DRAWINGS

Figure 2:
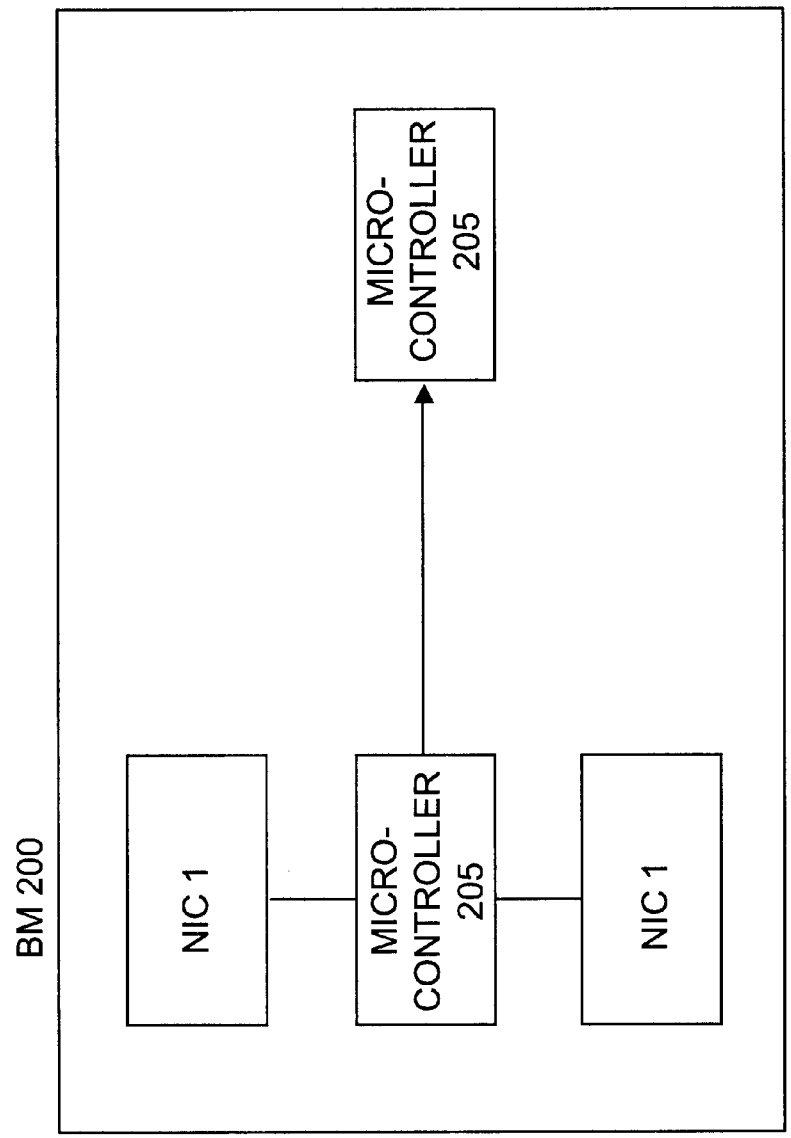
Figure 3:
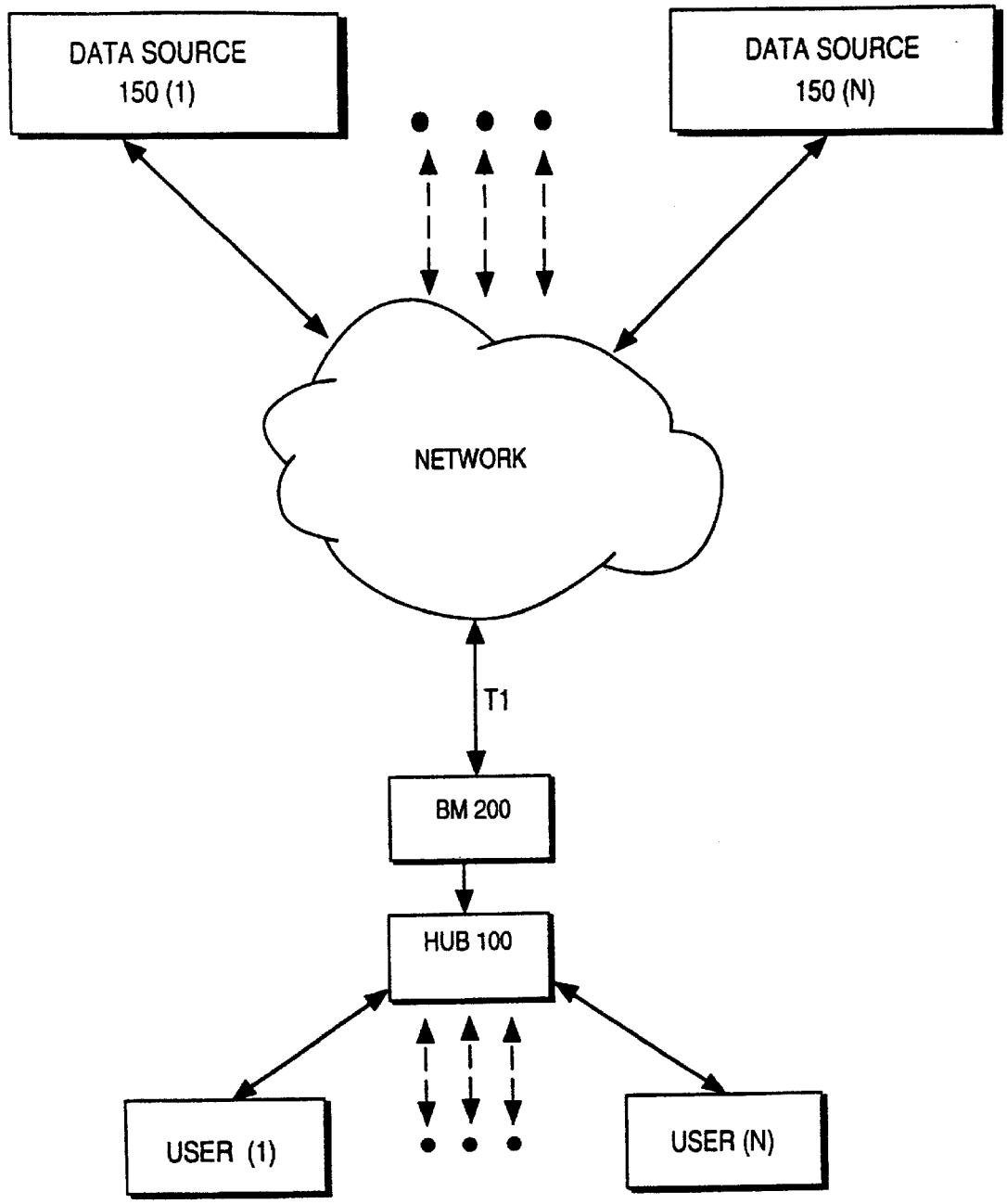
Figure 4:
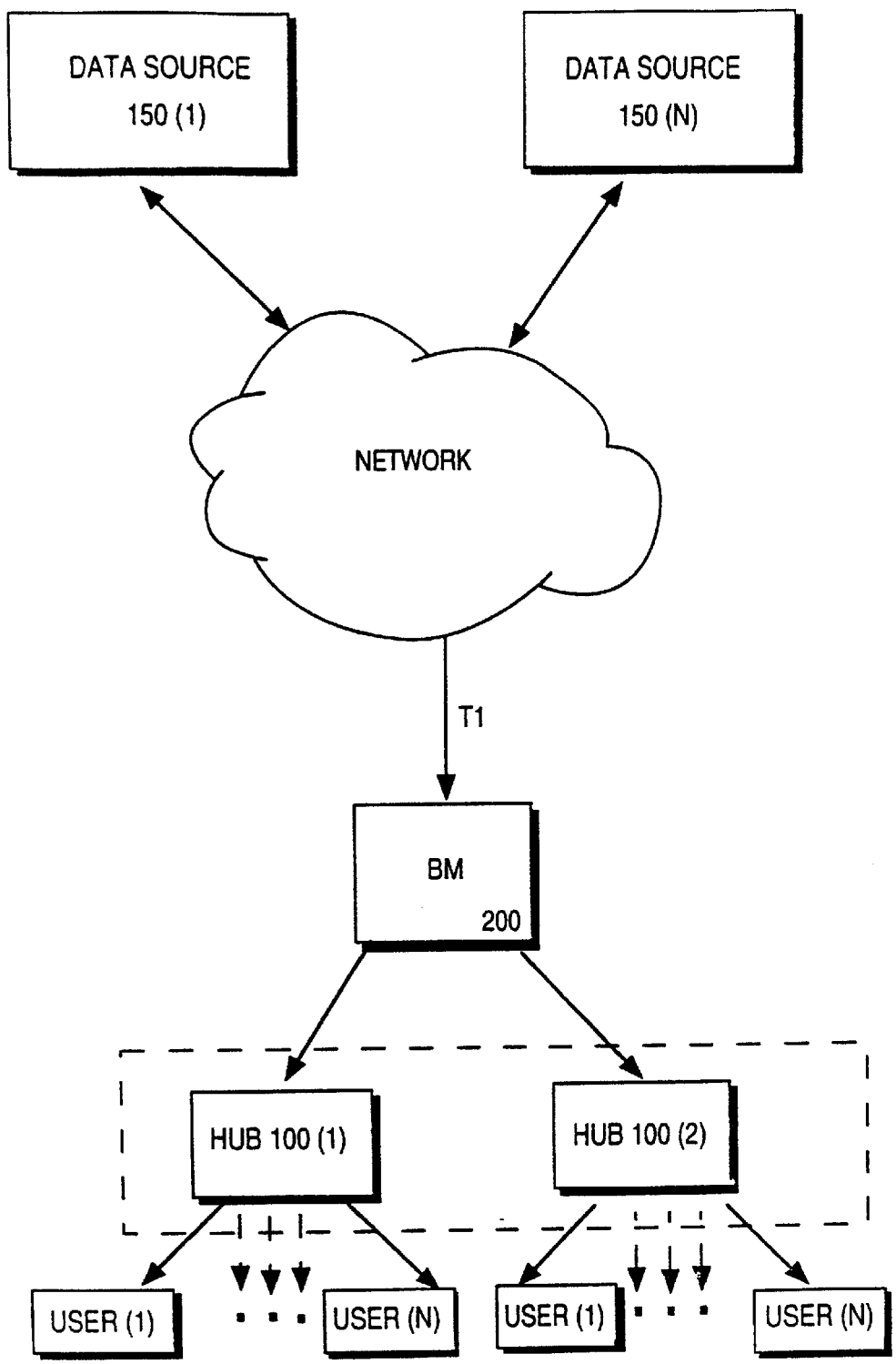
Figure 5A:
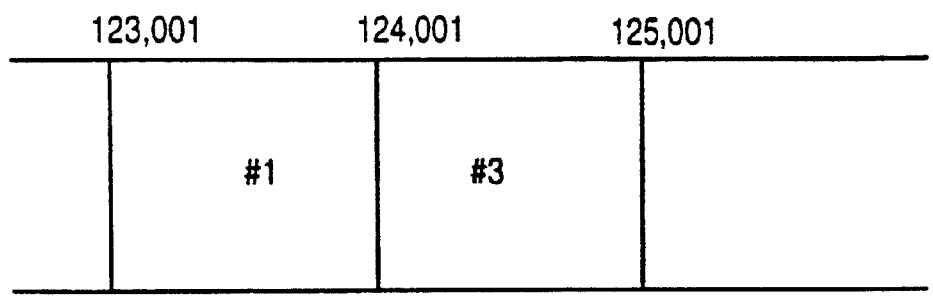
Figure 5A:
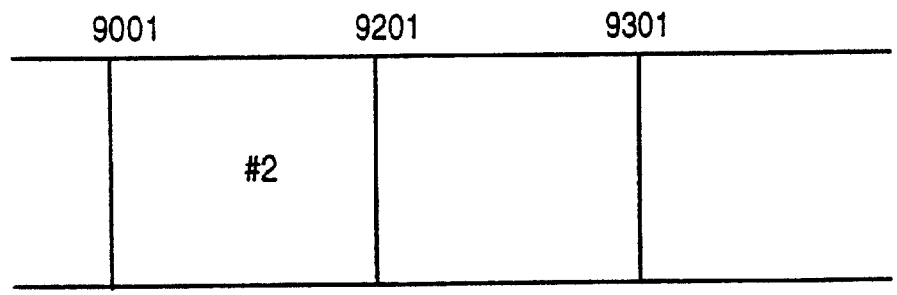
Figure 7:
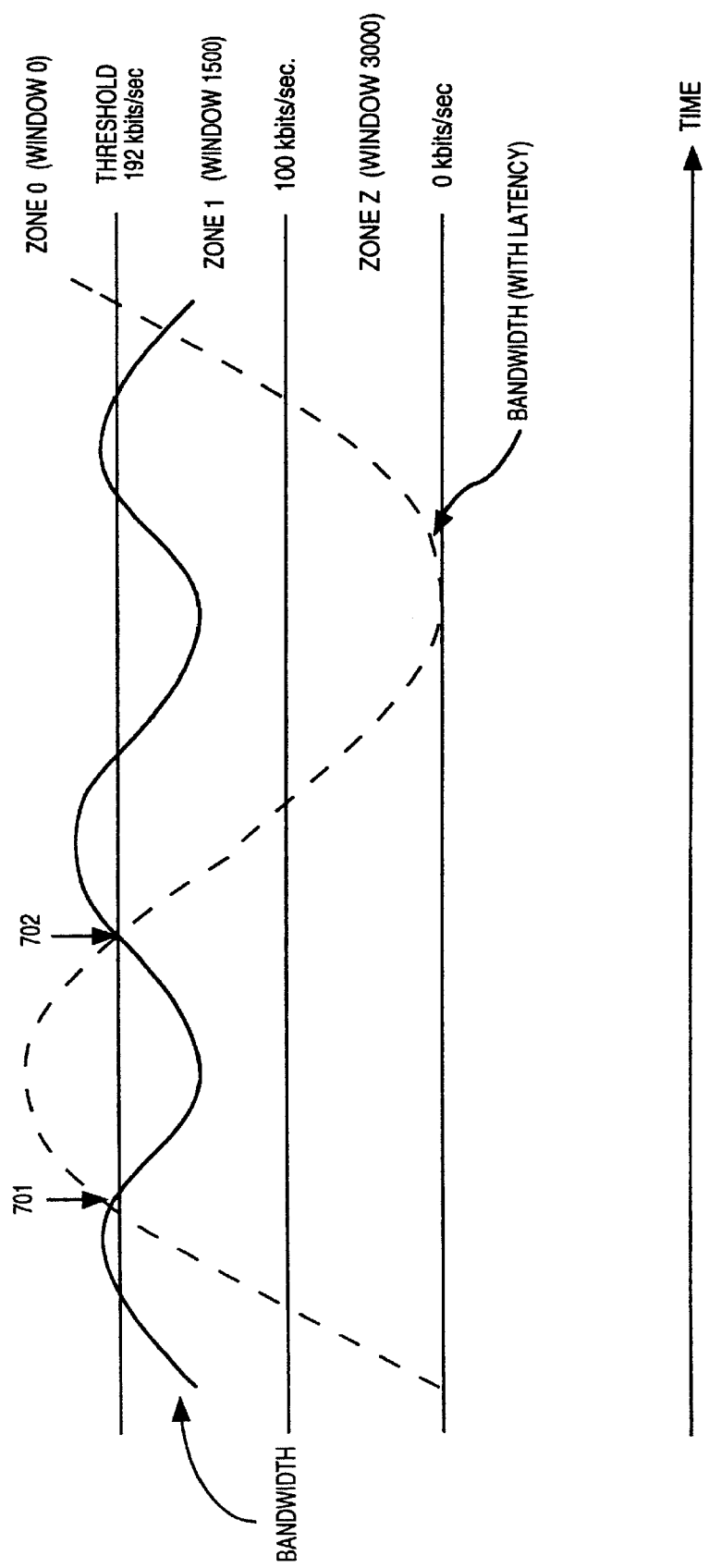
Figure 8A:
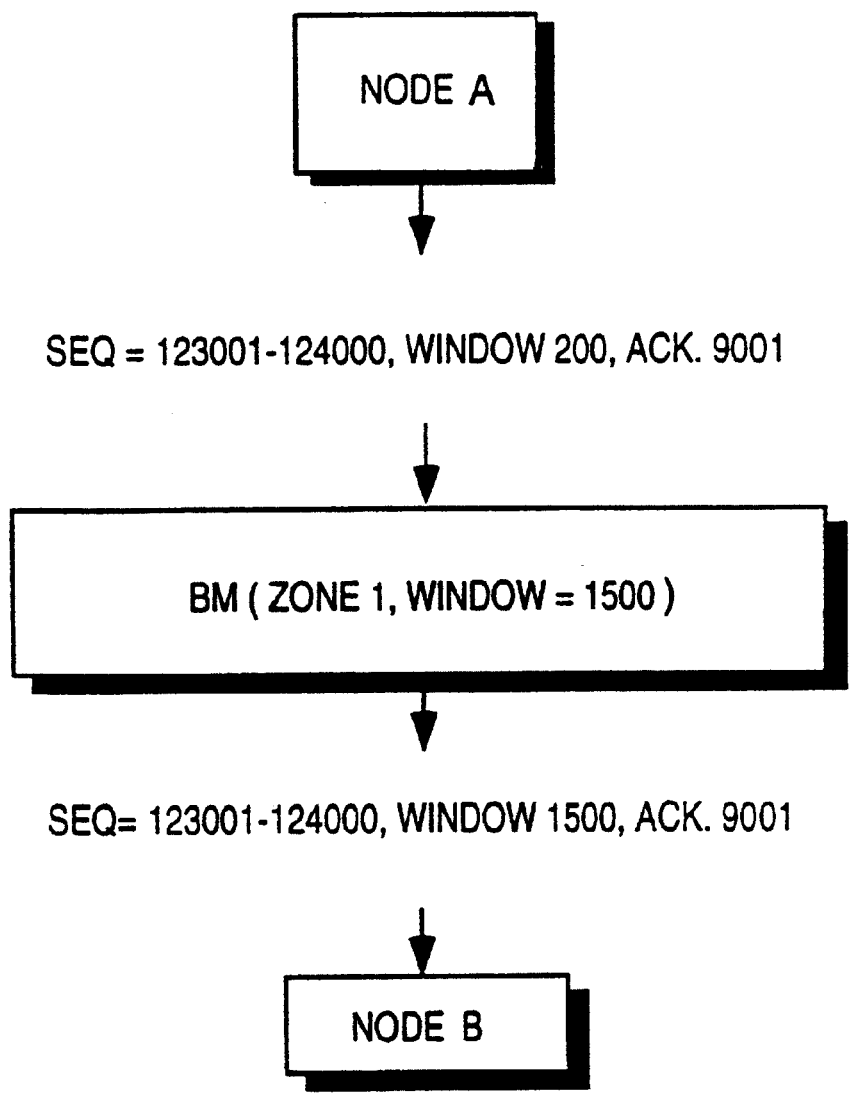
Figure 8B:
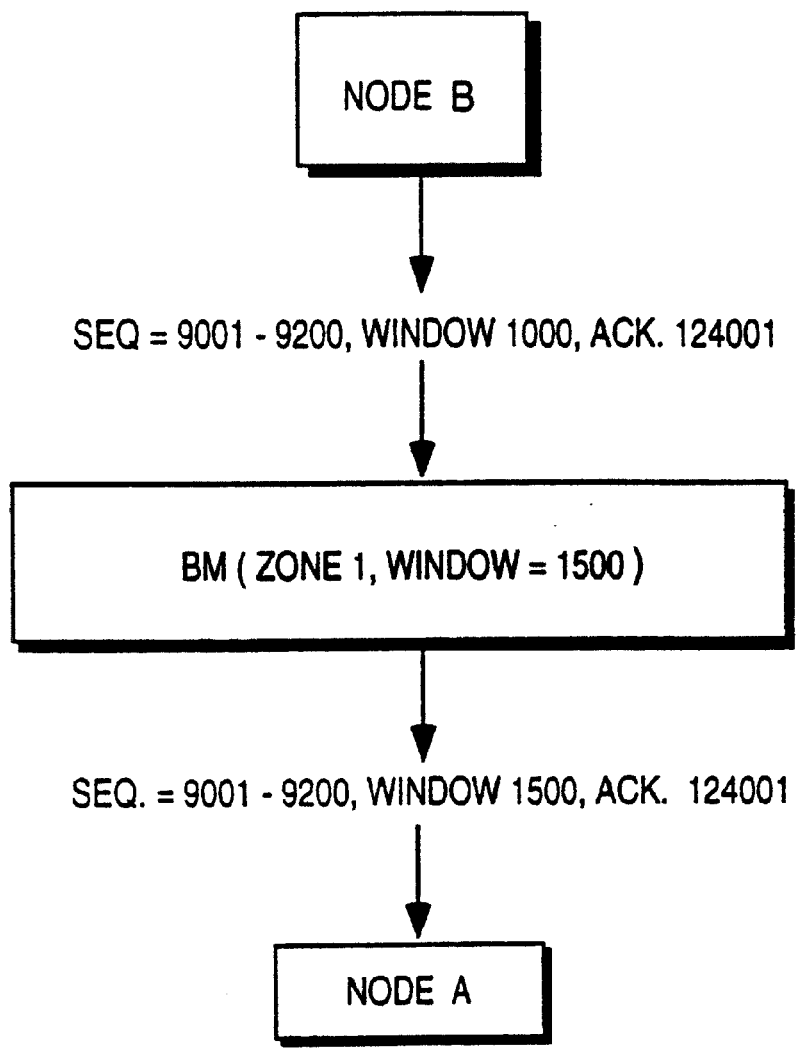
Figure 9:
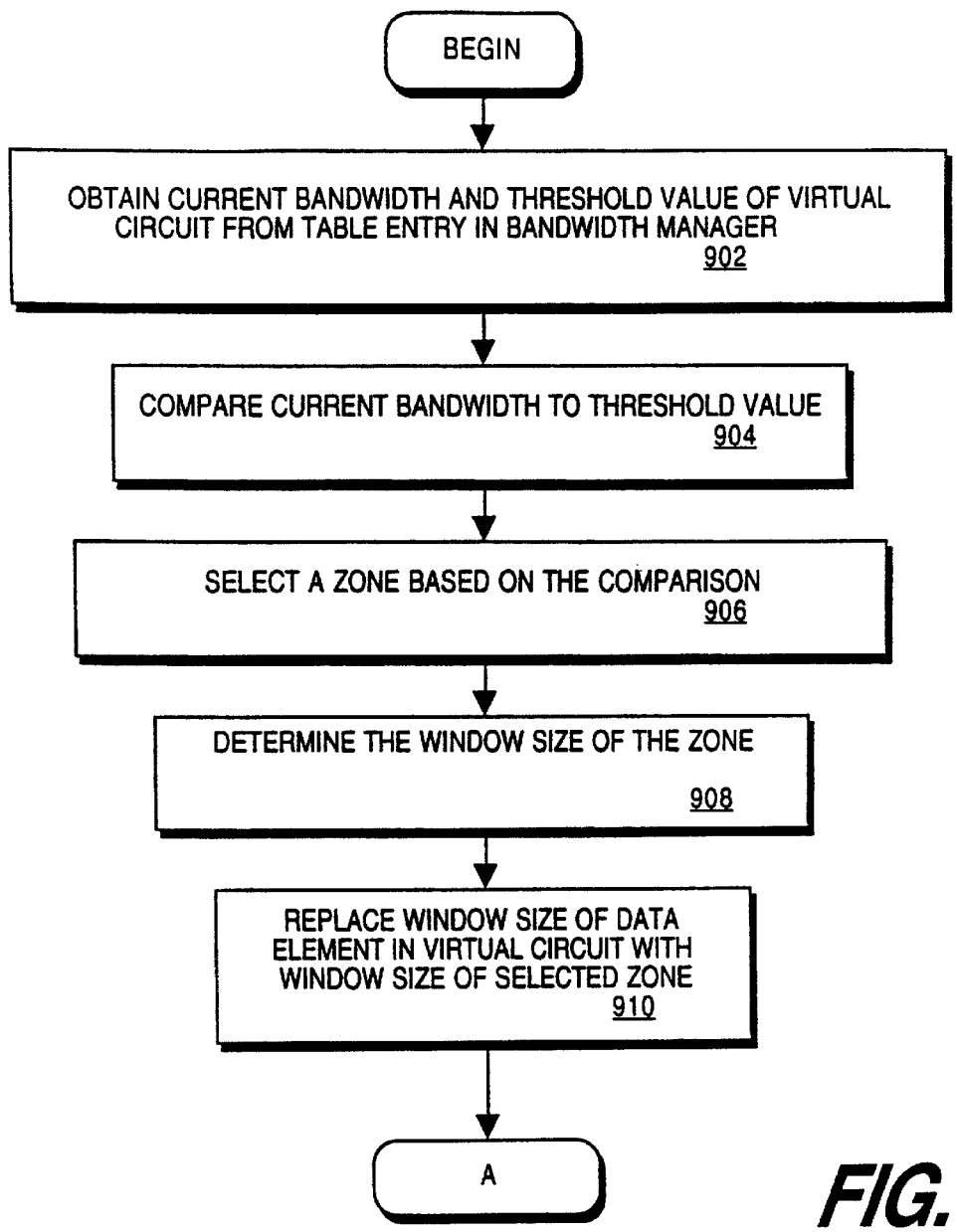
Figure 10:
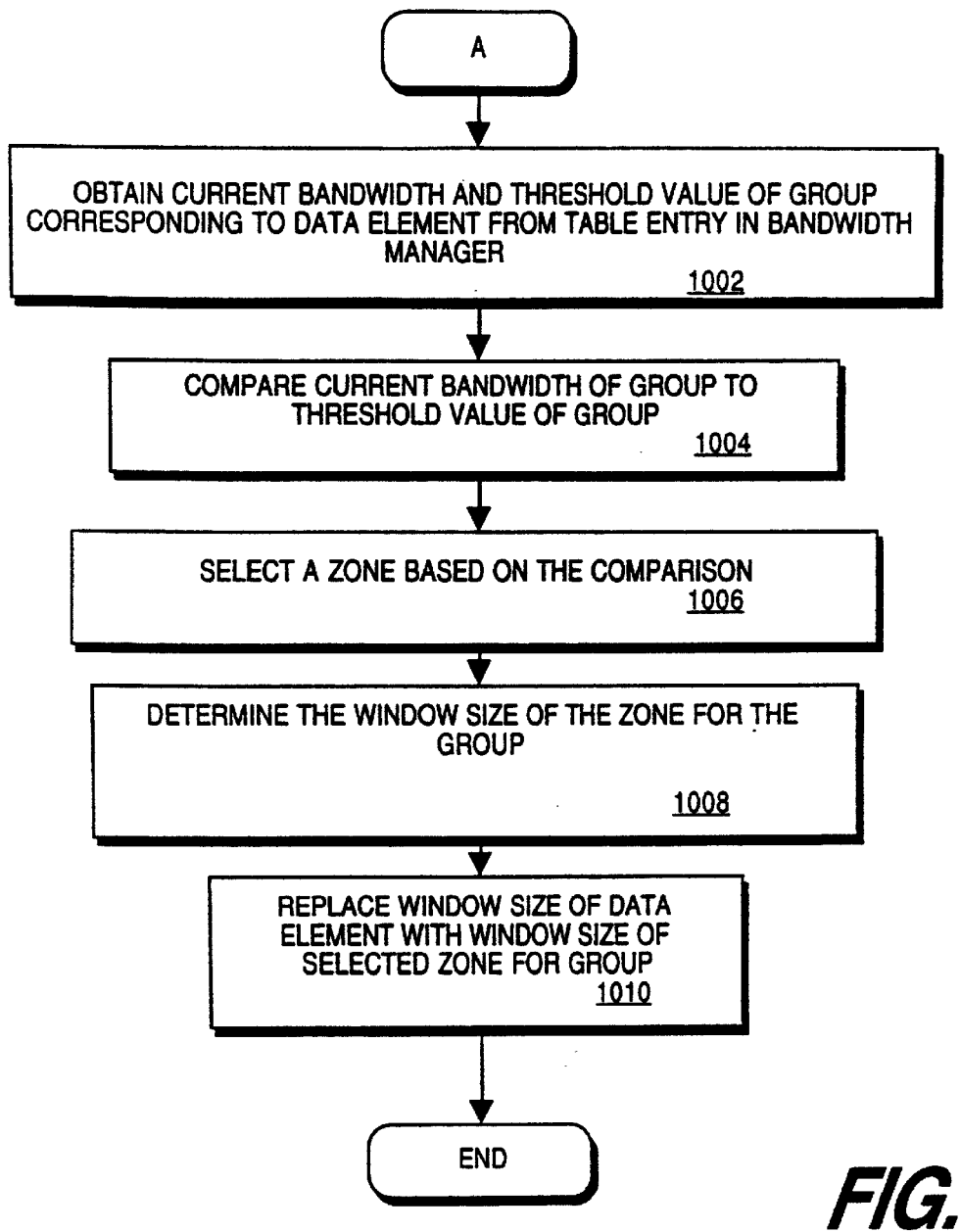

The present invention is illustrated by way of example and not by way of limitation in the figures of the accompanying drawings in which like reference numerals refer to similar elements and in which:

FIG. 1 illustrates an example of network congestion that may occur on a network today FIG. 2 illustrates an overview of the type of hardware that may be utilized according to one embodiment of the present invention FIG. 3 illustrates an overview of how BM 200 is utilized according to one embodiment of the present invention FIG. 4 illustrates an example according to an alternate embodiment of the present invention FIGS. 5A–5B illustrate an example of a conventional sliding window mechanism FIGS. 6A–6B illustrate examples of entries tables for virtual circuits and aggregates of virtual circuits FIG. 7 illustrates a threshold value and zones for a particular virtual circuit FIGS. 8A–8B illustrate an example according to one embodiment of the present invention FIG. 9 is a flow chart of one embodiment of the present invention FIG. 10 is a flow chart of an alternate embodiment of the present invention

DETAILED DESCRIPTION OF THE PREFERRED EMBODIMENT

The present invention relates to a method and apparatus for controlling network bandwidth. In the following detailed description, numerous specific details are set forth in order to provide a thorough understanding of the present invention. It will be apparent to one of ordinary skill in the art however, that these specific details need not be used to practice the present invention. In other instances, well known structures, interfaces and processes have not been shown in detail in order not to unnecessarily obscure the present invention.

FIG. 2 illustrates an overview of the type of hardware that may be utilized according to one embodiment of the present invention. A bandwidth manager (BM 200) includes at least micro controller 205, two network interface controllers (NIC1 and NIC2) and memory 210. Micro controller 205 may include, for example, an integrated circuit. According to one embodiment, micro controller 205 implements the bandwidth controlling functions described below. NIC1 connects (directly or indirectly) to one set of nodes while NIC2 connects (directly or indirectly) to a second set of nodes.

FIG. 3 illustrates an overview of how BM 200 is utilized according to one embodiment of the present invention. Specifically, as illustrated in FIG. 3, BM 200 is provided between data sources 150(1)–150(N) and hub 100. BM 200 acts to control network bandwidth between Users(1)–(N) and data sources 150(1)–150(N), thus resolving many of the standard network congestion problems described above. Additionally, as described in further detail below, BM 200 may also be utilized to allocate network bandwidth to various entities of the network, thus providing a complete solution to the problems of network bandwidth management.

FIG. 4 illustrates an example according to an alternate embodiment of the present invention. The illustrated example expands the example of FIG. 2 to include 2 hubs, Hub 100(1) and 100(2), each coupled to a certain number of users. These hubs may be separate switches or repeaters in a company that each provide access to the Internet, for example. Both hubs 100(1) and 100(2) share one T1 connection to data sources 150(1)–150(N). BM 200 is placed between data sources 150(1)–150(N) and hubs 100(1) and 100(2). In the illustrated example, this placement allows BM 200 to control the amount of bandwidth that each hub is allocated. Thus, for example, hub 100(1) may be allocated sixty percent of the bandwidth capabilities of the TI line while hub 100(2) may be allocated the remaining forty percent. A variety of other allocations may also be specified to satisfy the needs of the users coupled to each hub. Alternative embodiments of the present invention may also be practiced by placing BM 200 at a location on a network where network congestion is likely to occur.

FIGS. 5A-B illustrate an example of a conventional sliding window mechanism. In this example, a TCP sliding window mechanism is illustrated. Any other network protocol that support the same or a similar type of sliding window mechanism may also be utilized according to alternate embodiments of the present invention. The example assumes that there is a first data stream (Stream1) flowing from Node A to Node B, and a second data stream (Stream2) flowing from Node B to Node A, as illustrated in FIG. 5A. FIG. 5B illustrates the "header" information in the data elements sent between Nodes A and B. The header information is described in detail below.

In step 1 of FIG. 5B, Node A sends a data element to Node B. The data element from Node A includes a header portion and a data portion. The header portion informs Node B that Node A is sending 1000 bytes of data to Node B in Stream1, where the 1000 bytes are in Stream1 at sequence numbers 123001–124000 (illustrated in FIG. 5A). In the header portion, Node A also informs Node B that Node B has a window size of 200, i.e. Node B may transmit 200 bytes of data to Node A. Finally, Node A acknowledges in the header portion that Node A is ready to receive data from Node B in Stream2 beginning from the sequence number 9001. In this example, the window size of 200 for Node B is essentially a "credit" from Node A to Node B, i.e. Node B can send up to 200 bytes of data to Node A. Thus, if Node B only sends 100 bytes of data at a given time, Node B retains credit for the remaining 100 bytes and can send another 100 bytes to Node A at some future time. This is referred to as "credit based sliding window mechanism."

To summarize, the information in the header portion of the data element from Node A to Node B includes the following information. Node A sends data to Node B where the data is in Stream1 at sequence numbers 123001–124000. Node A tells Node B that Node B has a window size of 200, or a credit of 200 bytes. And finally, Node A acknowledges that Node A is ready to receive data from Node B beginning from data in Stream2 at sequence number 9001. At the end of step 1, as illustrated in FIG. 5A, data between 123001 and 124000 (labeled #1) in Stream1 has been sent from Node A to Node B.

In step 2 of FIG. 5B, Node B sends a data element to Node A. The header portion of this data element informs Node A that Node B is sending 200 bytes of data to Node A in Stream2, where the 200 bytes are in Stream2 at sequence numbers 9001–9200 (illustrated in FIG. 5A). In the header portion, Node B also informs Node A that Node A has a window size of 1000, i.e. Node A may transmit 1000 bytes of data to Node B. Finally, Node B acknowledges in the header portion that Node B is ready to receive more data from Node A in Stream1 beginning from the sequence number 124001. Recall that Node B had previously (in step 1) received from Node A data from 123001–124000. Thus, Node B is essentially informing Node A to continue sending the next set of data in Stream1, after 124000.

Once again, in summary, the information in the header portion of the data element from Node B to Node A includes the following information. Node B sends data to Node A where the data is in Stream2 at sequence numbers 9001–9200. Node B tells Node A that Node A has a window size of 1000, or a credit of 1000 bytes. And finally, Node B acknowledges that Node B is ready to receive data from Node A beginning from data in Stream1 at sequence number 124001. At the end of step 2, as illustrated in FIG. 5A, data between 9001–9200 (labeled #2) in Stream 2 has been sent from Node B to Node A.

These process continues until all data has been sent from Node A to Node B and vice versa (step 10, as illustrated in FIG. 5B). Thus, for example, in step 3, the information in the header portion of the data element from Node A to Node B includes the following information. Node A sends data to Node B where the data is in Stream1 at sequence numbers 124001–125000. Node A tells Node B that Node B has a window size of 200, or a credit of 200 bytes. And finally, Node A acknowledges that Node A is ready to receive data from Node B beginning from data in Stream2 at sequence number 9201. At the end of step 3, as illustrated in FIG. 5A, data between 124001–125000 (labeled #3) in Stream 1 has been sent from Node A to Node B, and the process continues.

A "virtual circuit" in the context of the present invention refers to a connection between two nodes, e.g. Nodes A and B in the above example, identified by an address. The address required to identify the virtual circuit is dependent on the layer in the Open Systems Interconnection (OSI) model in which the virtual circuit resides. The OSI model is an international standard that provides a common basis for the coordination of standards development, for the purpose of systems interconnection. In order to identify a virtual circuit in the network layer (layer 3) of the OSI model, for example, an address may be an Internet Protocol (IP) address. In the transport layer (layer 4) on the other hand, the address may comprise an IP address and a User Datagram Protocol (UDP) port number or a TCP port number.

Thus, in a TCP/IP protocol stack, a virtual circuit is identified by an IP address and a TCP Port number. Thus, the address of a virtual circuit in a TCP/IP protocol stack has the format of [(IP address for Node A, port A) (IP address for Node B, port B)] and may look as follows: [(192.101.12.101, 23) (15.1.3.102, 120)]. This link between the addresses of Node A and Node B is referred to as a virtual circuit in the context of a present invention.

According to one embodiment of the present invention, BM 200 maintains tables of entries, wherein each entry represents information pertaining to a virtual circuit or an aggregate of virtual circuits. FIGS. 6A and 6B illustrate examples of entries in tables for virtual circuits and aggregates of virtual circuits. More specifically, FIG. 6A illustrates information that is maintained for each virtual circuit and aggregate of virtual circuits while FIG. 6B illustrates corresponding group information (described below). An aggregate of virtual circuits comprises a number of different virtual circuits. Thus, for example, an aggregate of virtual circuits in a TCP/IP protocol stack may be identified as follows: [(192.101.12.*, 23) (15.1.3.102, 120)]. The * in the first node IP address indicates that the first node is in fact a number of different nodes, i.e. nodes having addresses (192.101.12.0) through (192.101.12.255).

According to one embodiment of the present invention, the current bandwidth of the virtual circuits and aggregate of virtual circuits is always maintained in tables 600 and 650. The value of the current bandwidth for an aggregate of virtual circuits is the total of current bandwidth of each of the individual virtual circuits that comprise the aggregate. The current bandwidth of an entry is calculated as the sum of bytes of data elements of the entry passing through during a time interval divided by the time interval. For example, if there are 5,000 bytes of data elements passing through BM 200 for a particular virtual circuit during a time interval of two seconds for entry A, then the traffic rate of the virtual circuit corresponding to entry A is 2,500 bytes per second at that moment.

For each virtual circuit and aggregate of virtual circuits, a set of threshold values is also maintained in tables 600 and 650. As illustrated, each table maintains 3 sets of threshold values. The table may, however, be configured to include any number of threshold values (one or more), i.e. the number of threshold values is not fixed. This set of threshold values represents a number of different desired bandwidth values or "target traffic rates" for each virtual circuit or aggregate of virtual circuits. These desired bandwidth values represent the traffic rate that BM 200 attempts to maintain for an entry based on predetermined criteria. For example, for virtual circuit VC1, the first threshold value, T1, may indicate the desired bandwidth for VC1 during business hours (9 am-5 pm). T2, on the other hand, may indicate a different desired bandwidth for VC1 after business hours, between 5 pm-9 am. T3 may indicate yet another desired bandwidth value associated with a particular time, event or any other predetermined criteria.

Finally, according to one embodiment of the present invention, each virtual circuit and aggregate of virtual circuits is also associated with a particular group in tables 600 and 650. As illustrated in FIG. 6A, VC3 and VCN belong to one group, G3. This may correspond, for example, to two users in a corporation that belong to a single department. Thus, by defining the two users as belonging to a group, as illustrated in FIGS. 6A–6B, table 600 in BM 200 can maintain individual threshold values for VC3 and VCN, while table 650 can maintain threshold values for group G3. Thus, the corporation, in this example, may determine that VC3 and VCN each have a predetermined bandwidth allowance, but that the department as a whole (G3) cannot exceed a different predetermined allowance.

Thus, given all the information maintained in table 600 and 650, BM 200 is able to constantly monitor the bandwidth of various virtual circuits and aggregate of virtual circuits, and adjust the traffic flow of each to achieve the desired bandwidth for that entry or for a group of entries. Note that the information maintained in table 600 and 650 can be modified dynamically as well as configured statically. Thus, for example, all values may be configured statically prior to the installation of BM 200 on the network. Alternatively, for example, the threshold values maintained in the tables may be adjusted dynamically by BM 200 to accommodate particularly high bandwidth usage of a network. Other such dynamic adjustments may also be made by BM 200. The following sections describe in detail how BM 200 performs these adjustments to achieve the desired bandwidth for each entry. Although the following sections illustrate a TCP example, embodiments of the present invention perform similarly with other types of network protocols or on other networks with similar characteristics.

BM 200 combines the functionality of the credit based sliding window mechanism described above (see FIGS. 5A–5B) with a "zoning" paradigm to control network bandwidth. The zoning paradigm involves the following. A threshold value is selected for each virtual circuit based on a predetermined criteria. Based on this threshold value, a series of appropriate zones are defined for each virtual circuit. A threshold value and zones for a particular virtual circuit are illustrated in FIG. 7. As illustrated, each zone is associated with a particular traffic rate or bandwidth. Thus, as data elements of a particular virtual circuit pass through BM 200, the current bandwidth of the virtual circuit is calculated.

Based on the current bandwidth, the data element is determined to belong to a particular zone. Each zone is also associated with a "replacement window size." As described above, the header portion of each data element includes information about a window size, referred to herein as the "original window size." When a data element is determined to fall within the bandwidth of a particular zone, this original window size is replaced with the replacement window size associated with that zone. This allows BM 200 to control the flow of traffic in a virtual circuit "on the fly" i.e. the data elements are intercepted, the window sizes are replaced and the data is passed along unaltered. The data is also not buffered on BM 200 according to one embodiment. According to an alternate embodiment, the data may be buffered on BM 200.

In the example illustrated in FIG. 7, assume that the data element of the virtual circuit has an original window size of 200 and the threshold value of the virtual circuit is determined to be 192 kbits/sec, i.e. BM 200 has been configured to maintain the desired bandwidth of that virtual circuit at 192 kbits/sec. The current bandwidth of the data element passing through BM 200 is calculated. If the current bandwidth is 150 kbits/sec, for example, then the data element is deemed to belong to Zone 1, i.e. below the desired or threshold bandwidth. If, on the other hand, the current bandwidth is calculated to be 200 kbits/sec, then the data element is deemed to belong to Zone 0, i.e. above the desired or threshold bandwidth.

Assume also in this example that a 0 byte replacement window size is associated with Zone 0 and a 1500 replacement window byte size is associated with Zone 1. The basic idea is to have the window size of Zone 0 be small enough that the window size is not able to sustain the traffic rate in that zone. Similarly, the window size in Zone 1 is large enough that the traffic rate overshoots Zone 1 and goes into Zone 0. Thus, if the data element is in Zone 1, the original window size of 200 is replaced with 1500, i.e. the replacement window size associated with Zone 1. If, on the other hand, the data element is in Zone 0, the original window size of 200 is replaced with 0, i.e. the replacement window size associated with Zone 0. This conforms with the basic idea described above, namely the window size of Zone 0 is such that it cannot sustain the traffic rate of 192 kbits/sec and causes the traffic rate to dip below Zone 0 into Zone 1 (shown in FIG. 7 as point 701). At the same time, the window size of Zone 1 is such that the traffic rate in that zone causes the traffic rate to overshoot Zone 1, thus returning to a traffic rate within Zone 0 (shown in FIG. 7 as point 702).

In this manner, BM 200 controls the flow of traffic through BM 200. By replacing the original window size of the data element with a smaller or a larger replacement window size, the traffic rate or current bandwidth of the data element is reduced or increased. The consequence of this manipulation of window sizes is that the resulting traffic rate or current bandwidth of each virtual circuit over the long run oscillates between Zone 0 and Zone 1, thus approximating the threshold or desired bandwidth. Although this example describes only two zones, as illustrated in FIG. 7, multiple zones may be defined. In a practical application of the above described oscillation between zones, the first and second node may be distantly located, thus resulting in a lag time or latency period before the oscillation occurs. Thus, the oscillation to adjust the bandwidth may occur over a longer period of time and over multiple zones, as illustrated by the dotted lines in FIG. 7.

FIGS. 8A–8B illustrate an example of the process described above. This example corresponds to the original set of data elements sent between Nodes A and B, illustrated in FIGS. 5A–5B. In this example, Node A sends a data element to Node B via BM 200. As before, the header portion informs Node B that Node A is sending 1000 bytes of data to Node B in Stream1, where the 1000 bytes are in Stream1 at sequence numbers 123001–124000 (illustrated in FIG. 5A). In the header portion, Node A also informs Node B that Node B has a window size of 200, i.e. Node B may transmit 200 bytes of data to Node A. Finally, Node A acknowledges in the header portion that Node A is ready to receive data from Node B in Stream2 beginning from the sequence number 9001.

In this embodiment of the present invention, however, the data element is intercepted by BM 200 and the header portion of the data element is examined to determine the original window size, here 200. Tables 600 and 650 in BM 200 are also examined to determine a current bandwidth and an appropriate threshold value for the data element. If the data element is deemed to fall into Zone 1, illustrated in FIG. 7, then the original window size of 200 is replaced with a replacement window size of 1500. If the data element is deemed to fall into Zone 0, then the original window size of 200 is replaced with a replacement window size of 0. In this example, the data element is assumed to have fallen into Zone 1 and the original window size of 200 is replaced with a replacement window size of 1500. Thus, as illustrated, when the data element is received by Node B, the header portion of the data element now indicates a window size of 1500, i.e. Node A tells Node B that Node B can send up to 1500 bytes, rather than the original 200 bytes. Note that as illustrated in FIG. 8A, Node B never sees the original window size of 200 because BM 200 intercepts and replaces the original window size before the data element is received at Node B.

Similarly, Node B sends a data element to Node A via BM 200. As before, the header portion of this data element informs Node A that Node B is sending 200 bytes of data to Node A in Stream2, where the 200 bytes are in Stream2 at sequence numbers 9001–9200 (illustrated in FIG. 5A). In the header portion, Node B also informs Node A that Node A has a window size of 1000, i.e. Node A may transmit 1000 bytes of data to Node B. Finally, Node B acknowledges in the header portion that Node B is ready to receive more data from Node A in Stream1 beginning from the sequence number 124001.

In this embodiment of the present invention, however, the data element is intercepted by BM 200 and the header portion of the data element is examined to determine the original window size, here 1000. Tables 600 and 650 in BM 200 are also examined to determine a current bandwidth and an appropriate threshold value for the data element. If the data element is deemed to fall into Zone 1, illustrated in FIG. 7, then the original window size of 1000 is replaced with a replacement window size of 1500. If the data element is deemed to fall into Zone 0, then the original window size of 1000 is replaced with a replacement window size of 0. In this example, the data element is assumed to have fallen into Zone 1 and the original window size of 1000 is replaced with the replacement window size of 1500. Thus, as illustrated, when the data element is received by Node A, the header portion of the data element now indicates a window size of 1500, i.e. Node B tells Node A that Node A can send up to 1500 bytes, rather than the original 1000 bytes. Once again, note that as illustrated in FIG. 8B, Node A never sees the original window size of 1000 because BM 200 intercepts and replaces the original window size before the data element is received at Node A.

FIG. 9 illustrates a flow chart of one embodiment of the present invention. In step 902, the current bandwidth and threshold value of the data element are obtained from the corresponding entry in the table in the bandwidth manager. The current bandwidth is then compared to the threshold value in step 904. Based on this comparison, in step 906, a zone is selected for the data element. In step 908, the window size of the zone is then determined. In step 910, the original window size of the data element is replaced with the replacement window size of the selected zone.

FIG. 10 illustrates a flow chart of an alternate embodiment of the present invention. In this alternate embodiment, all the steps in the flow chart of FIG. 9 are still performed. In this embodiment, however, the following steps also occur. Assume that G1 is the group to which the data element in this flow chart belongs. Thus, in step 1002, the current bandwidth and threshold value of group G1 are obtained from the corresponding entry in the table in the bandwidth manager. The current bandwidth of group G1 is then compared to the threshold value of group G1 in step 1004. Based on this comparison, in step 1006, a zone is selected for group G1. In step 1008, the window size of the zone for group G1 is then determined. In step 1010, the original window size of the data element is replaced with the replacement window size of the selected zone for group G1.

Thus, a method and apparatus for controlling network bandwidth is disclosed. The specific arrangements and methods described herein, are merely illustrative of the principles of the present invention. Numerous modifications in form and detail may be made by those of ordinary skill in the art without departing from the scope of the invention. Although this invention has been shown in relation to a particular embodiment, it should not be considered so limited. Rather, the present invention is limited only by the scope of the appended claims.

What is claimed is:

1. A method for controlling network bandwidth between a first node and a second node on a network, the method comprising the steps of:

intercepting a data element transmitted from the first node to the second node, the data element comprising a data portion and a header portion, the header portion including an original window size;

replacing the original window size in the header portion of the data element with a replacement window size, the data portion of the data element remaining unmodified; and routing the data element to the second node, the header portion of the data element being coupled to the replacement window size, the step of replacing further including the steps of:

determining a current bandwidth and a threshold value of the data element;

comparing the current bandwidth of the data element to the threshold value of the data element to determine a zone for the data element;

identifying the replacement window size associated with the zone for the data element; and replacing the original window size with the replacement window size, wherein the step of replacing further includes the steps of:

determining a current bandwidth and a threshold value of a group to which the data element belongs;

comparing the current bandwidth of the group to the threshold value of the group to determine a zone for the group; and identifying the replacement window size associated with the zone for the group; and replacing the replacement window size with a second replacement window size, and wherein the steps of determining the current bandwidth and the threshold value of the data element and the group to which the data element belongs further includes the steps of;

examining a data structure to determine the current bandwidth of the data element and the threshold value of the data element; and examining the data structure to determine the current bandwidth of the group and the threshold value of the group.

2. A method for controlling network bandwidth between a first node and a second node on a network, the method comprising the steps of:

intercepting a data element transmitted from the first node to the second node, the data element comprising a data portion and a header portion, the header portion including an original window size;

replacing the original window size in the header portion of the data element with a replacement window size, the data portion of the data element remaining unmodified; and routing the data element to the second node, the header portion of the data element being coupled to the replacement window size, the step of replacing further including the steps of:

determining a current bandwidth and a threshold value of the data element;

comparing the current bandwidth of the data element to the threshold value of the data element to determine a zone for the data element;

identifying the replacement window size associated with the zone for the data element; and replacing the original window size with the replacement window size, wherein the data element is unbuffered and the step of replacing is performed on the fly.

3. A method for controlling network bandwidth between a first node and a second node on a network, the method comprising the steps of:

intercepting a data element transmitted from the first node to the second node, the data element comprising a data portion and a header portion, the header portion including an original window size;

replacing the original window size in the header portion of the data element with a replacement window size, the data portion of the data element remaining unmodified; and routing the data element to the second node, the header portion of the data element being coupled to the replacement window size, the step of replacing further including the steps of:

determining a current bandwidth and a threshold value of the data element;

comparing the current bandwidth of the data element to the threshold value of the data element to determine a zone for the data element;

identifying the replacement window size associated with the zone for the data element; and replacing the original window size with the replacement window size, wherein the data element is associated with a virtual circuit.

4. A bandwidth controller coupled to a first node via a first network transmitting data having a data portion and a header portion, the header portion including an original window size the bandwidth controller also coupled to a second node via a second network, the bandwidth controller intercepting data from the first node to the second node, wherein the bandwidth controller replaces the original window size in the header portion with a replacement window size prior to routing the data from the first node to the second node, the replacing including:

determining a current bandwidth and a threshold value of the data;

comparing the current bandwidth of the data to the threshold value of the data to determine a zone for the data;

identifying the replacement window size associated with the zone for the data; and replacing the original window size with the replacement window size.

* * * * *

UNITED STATES PATENT AND TRADEMARK OFFICE
CERTIFICATE OF CORRECTION

PATENT NO.    : 6,816,459 B2
DATED         : November 9, 2004
INVENTOR(S)   : Jamp et al.

It is certified that error appears in the above-identified patent and that said Letters Patent is hereby corrected as shown below:

Column 3,
Line 56, kindly change "capabilities of the TI line" to -- capabilities of the T1 line --.

Column 4,
Line 24, kindly change "referred to as" to -- referred to as a --.

Column 6,
Lines 28-29, kindly change "table 600 and 650," to -- tables 600 and 650, --.
Line 33, kindly change "in table 600 and 650," to -- in tables 600 and 650 --.

Column 9,
Line 50, kindly change "group; and" to -- group; --.

Signed and Sealed this

Fourth Day of January, 2005

JON W. DUDAS
*Director of the United States Patent and Trademark Office*